United States Patent [19]

Valentine

[11] Patent Number: 4,494,739

[45] Date of Patent: Jan. 22, 1985

[54] POWER OPERATED ROTATABLE CLAMPING ASSEMBLY

[75] Inventor: Al L. Valentine, Southfield, Mich.

[73] Assignee: State Die & Engineering, Inc., Roseville, Mich.

[21] Appl. No.: 472,401

[22] Filed: Mar. 4, 1983

[51] Int. Cl.[3] ............................................ B23Q 3/08

[52] U.S. Cl. .................................... 269/32; 269/77; 269/233; 269/93; 269/237

[58] Field of Search .................... 269/233, 27, 32, 24, 269/71, 77–78, 20, 93–94, 237–239

[56] References Cited

U.S. PATENT DOCUMENTS

| | | | |
|---|---|---|---|
| 930,687 | 8/1909 | Pfeifer | 269/78 |
| 1,274,074 | 7/1918 | O'Brien | 269/78 |
| 1,351,232 | 8/1920 | Collins | 269/77 |
| 3,482,830 | 12/1969 | Sendoykas | 269/32 |
| 3,570,835 | 3/1971 | McPherson | 269/233 |

FOREIGN PATENT DOCUMENTS

| | | | |
|---|---|---|---|
| 427461 | 6/1967 | Switzerland | 269/32 |

*Primary Examiner*—Robert C. Watson
*Attorney, Agent, or Firm*—Krass & Young

[57] ABSTRACT

A clamping assembly is operated by a piston and cylinder assembly rotatably mounted on a support. A mounting bracket rotatably mounted on the support is provided with a pair of pivotally mounted plates each having a clamping arm and a cam track. The mounting bracket includes an annular shoulder engaging the support; a flange draws the shoulder against the support, thereby selectively locking the bracket and the piston and cylinder against rotation in any of a plurality of rotational positions. A drive rod connected to the piston extends through the support and into an elongate slot in the bracket. A pair of rollers secured to the outer end of the rod are disposed in the cam slots and drive the plates to pivot. The cam slots are specially configured to lock the clamp in a locking position in the event that fluid pressure is lost in the piston.

11 Claims, 8 Drawing Figures

Fig-1
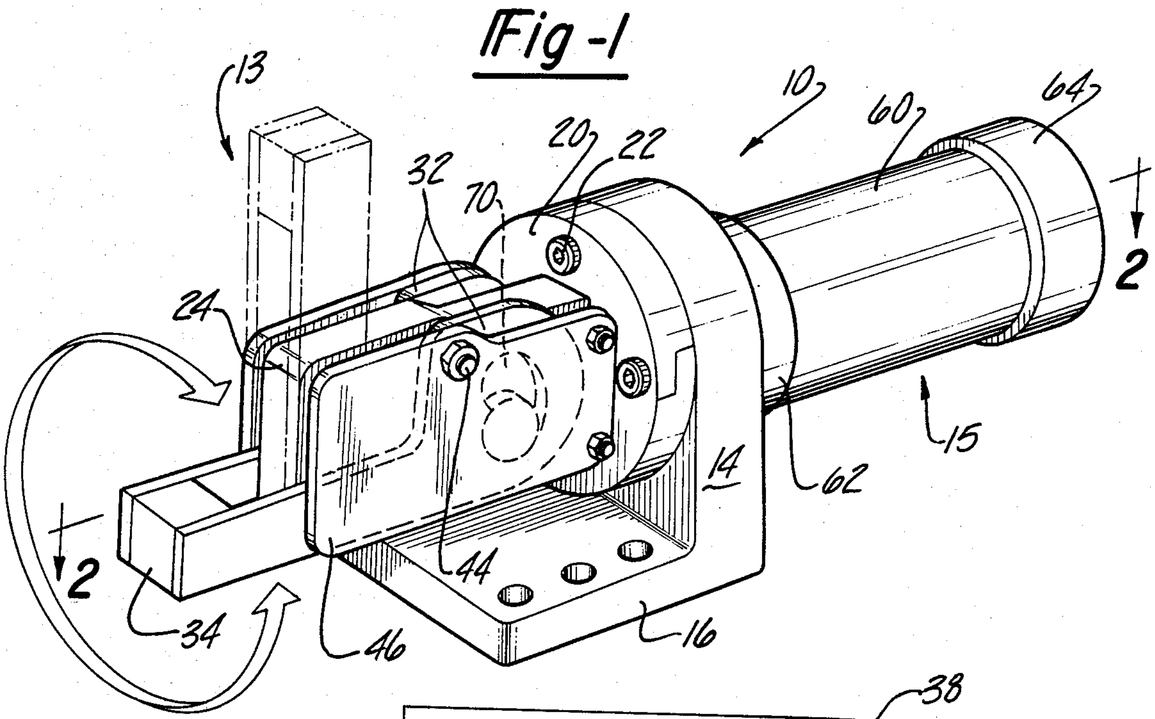
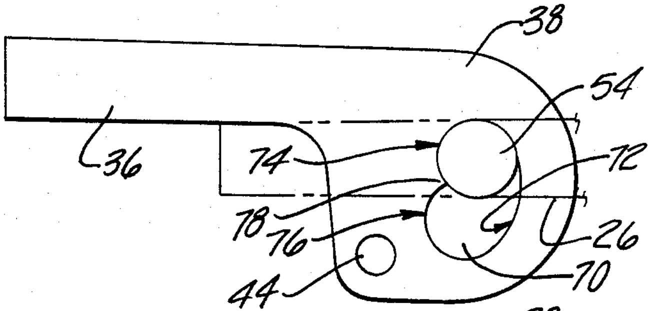
Fig-5A
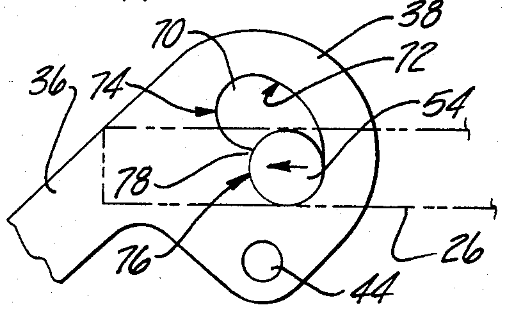
Fig-5B
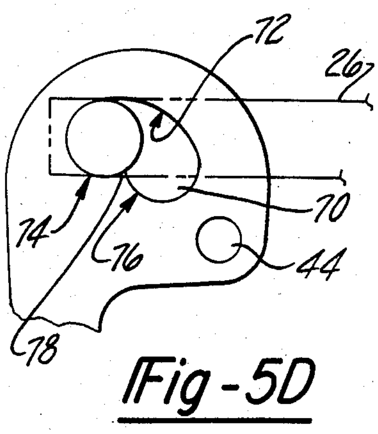
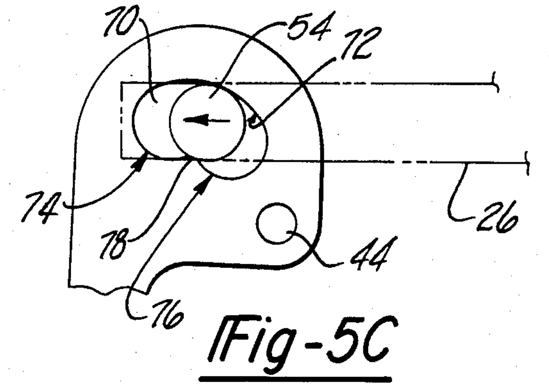
Fig-5D
Fig-5C

POWER OPERATED ROTATABLE CLAMPING ASSEMBLY

DESCRIPTION

1. Technical Field

The present invention broadly relates to clamping devices and deals more particularly with a power operated clamping device which may be rotated to allow clamping in any of a plurality of rotational positions.

2. Background Art

Various types of clamping devices are used in manufacturing operations to securely hold parts or the like during machine operations. There is an increasing need for clamping devices which are versatile and readily adaptable for use in clamping various types of parts in numerous positions. For example, in the past, where a change was made in the geometry of the part to be clamped, it was often necessary to physically relocate the clamping device; this often required unbolting the clamping device and securing it in a new position relative to the part. Such a procedure is obviously costly because of the labor required to relocate the clamping device as well as in terms of the down time of manufacturing operations.

In many applications, clamping devices of the type described above are operated by a fluid driven piston and cylinder assembly. For reasons of safety, mechanical means must be provided for locking the clamp in a clamping position in the event that fluid pressure is lost from the cylinder. This mechanical requirement obviously increases the mechanical complexity of the clamping device and may be feasible where the device must be sufficiently versatile to allow clamping of the part in a variety of positions.

Accordingly, it is a primary object of the present invention to provide a power operated clamping assembly which allows clamping a part in a variety of positions. As a corollary to the foregoing object, it is a further object to provide a clamping assembly having a clamping member which may be rotated to any of a plurality of clamping positions.

A still further object of the present invention is to provide a clamping assembly as described above which is particularly simple in construction and quite reliable.

Another object of the invention is to provide a clamping assembly as described above which includes a mechanical locking feature for locking a clamping member in a locked, clamping position in the event of a failure of a fluid operated motor which normally operates the clamping member.

These, and further objects of the invention, will be made clear or will become apparent during the course of the following description of a preferred embodiment of the present invention.

SUMMARY OF THE INVENTION

According to the present invention, a clamping assembly is operated by a piston and cylinder assembly rotatably mounted on a support. A mounting bracket rotatably mounted on the support is provided with a pair of pivotally mounted plates each having a clamping arm and a cam track. The mounting bracket includes an annular shoulder engaging the support; a flange draws the shoulder against the support, thereby selectively locking the bracket and piston/cylinder against rotation in any of a plurality of rotational positions. A drive rod connected to the piston extends through the support and into an elongate slot in the bracket. A pair of rollers secured to the outer end of the rod are disposed in the cam slots and drive the plates to pivot. The cam slots are specially configured to lock the clamp in a locking position in the event that fluid pressure is lost in the piston.

BRIEF DESCRIPTION OF THE DRAWINGS

In the drawings, which form an integral part of the specification and are to be read in conjunction therewith, and in which like reference numerals are employed to designate identical components in the various views:

FIG. 1 is a perspective view of the power operated, rotatable clamping assembly of the present invention, the clamping position of the clamping arm being shown in the phantom;

BEST MODE FOR CARRYING OUT THE INVENTION

Figure 2:
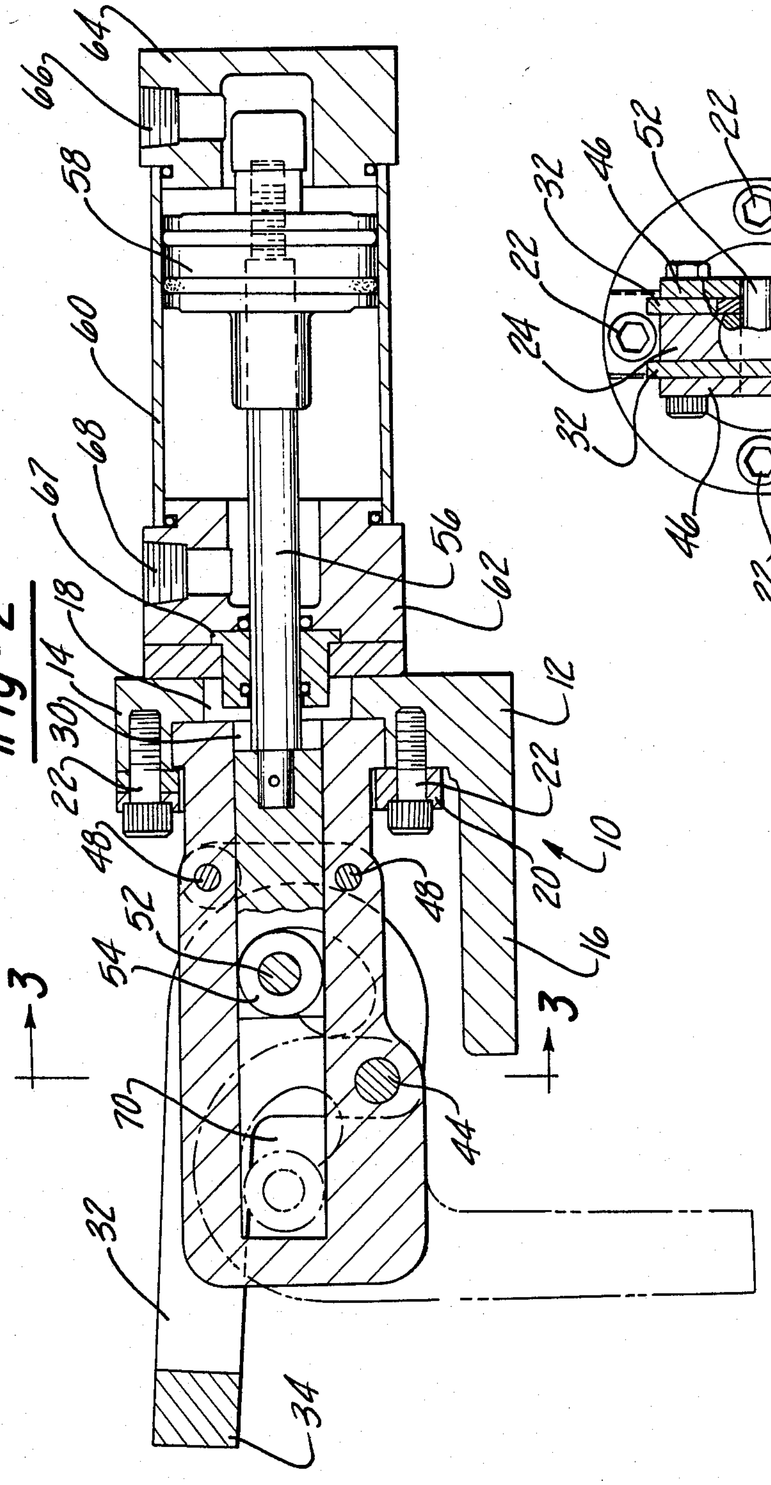
FIG. 2 is a sectional view taken along the line 2—2 of FIG. 1.
Figure 3:
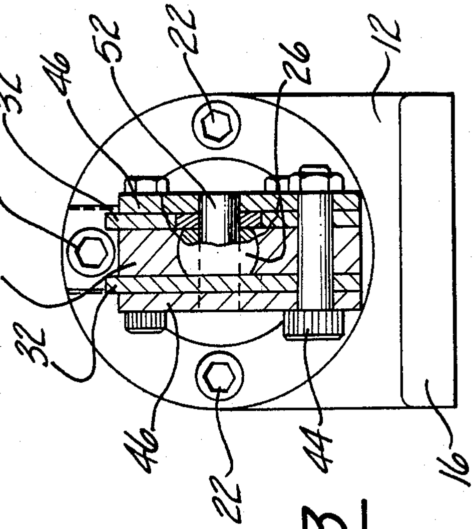
FIG. 3 is a sectional view taken along the line 3—3 of FIG. 2.
Figure 4:
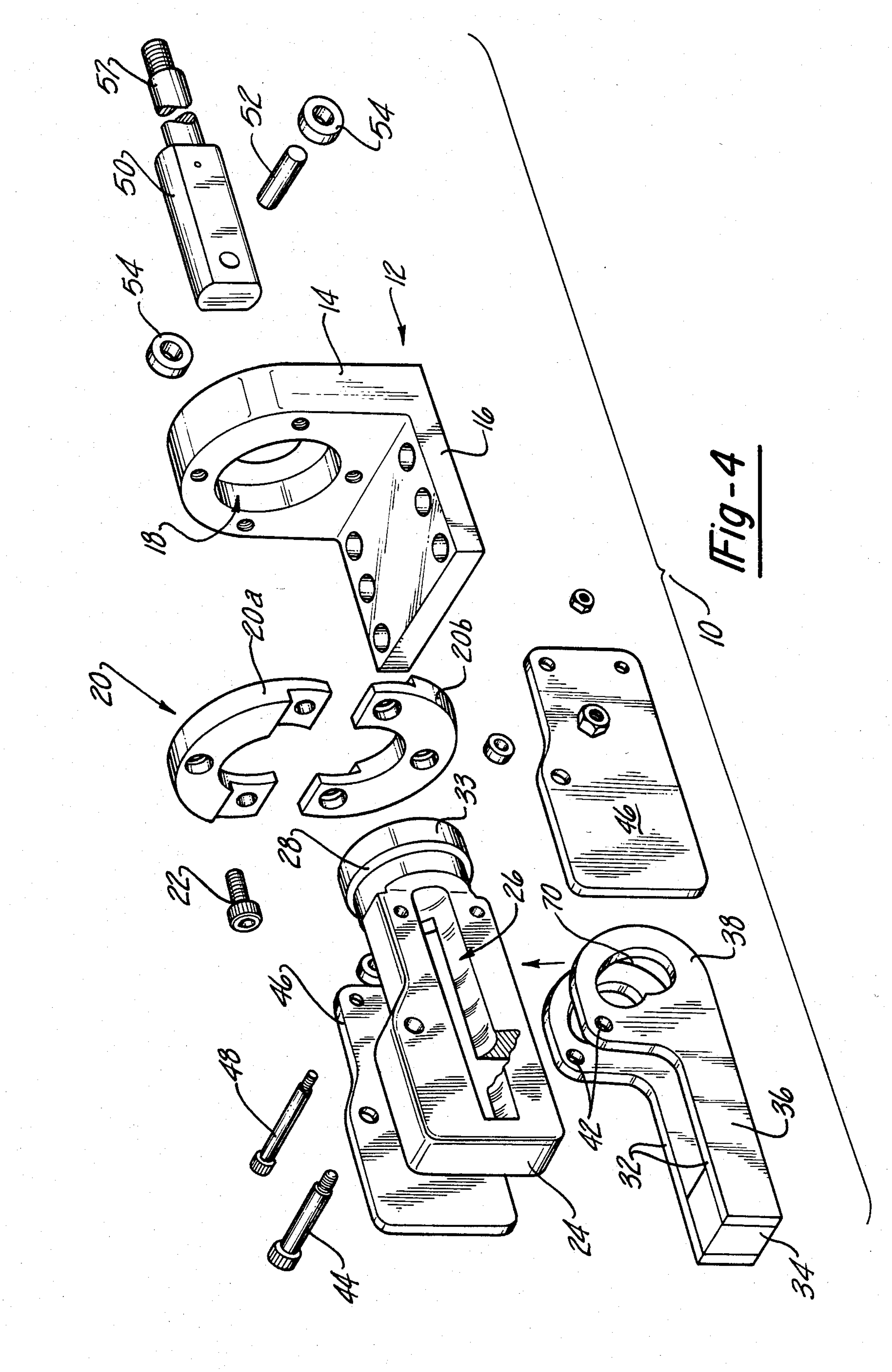
FIG. 4 is a perspective, exploded view of the clamping assembly shown in FIG. 1; and, FIGS. *5a*–*5d* are diagrammatic views of the camming mechanism showing its progressive operation from an unclamped position to a clamped position.

Referring first to FIGS. 1–4, the present invention is broadly concerned with a power operated, rotatable clamping assembly generally indicated by the numeral 10. Clamping assembly 10 broadly includes a fluid operated, piston and cylinder assembly 15 and a clamping mechanism 13 mounted on a support 12.

Support 12 includes a flat base 16 adapted to be mounted on any suitable structure adjacent the part to be clamped and an upstanding bracket 14 having a counterbored hole 18 therethrough.

The piston and cylinder assembly 15 includes a cylinder 60 closed at the opposite ends thereof by end caps 62 and 64 which are respectively provided with fluid ports 68 and 66. A piston 58 is reciprocably confined within the cylinder 60 and has secured thereto a piston rod 56 which extends forwardly through end cap 62 and seal 67 through the hole 18 in support 12. The piston and cylinder assembly 15 is mounted for rotation on bracket 14 by means which will later be discussed.

The clamping mechanism 13 broadly includes bracket 24, locking flange 20 and clamping plates 32. Bracket 24 is cylindrical in shape on one end 33 and is provided with an annular shoulder 28 which is rotatably received within the counterbore of hole 18. Flange 20 includes first and second interlocking portions **20*a* and 20*b* which are secured to one face of the bracket 14 by a cap screw 22. The inner face of flange portions 20*a* and 20*b* slideably engage shoulder 28. The cylindrical end 33 of bracket 24 is therefore rotatable within the counterbore of hole 18 until the flange 20 is tightened with screws 22, thereby locking the bracket 24** in any of a plurality of rotational positions.

Bracket 24 includes an aperture 30 in the end thereof through which the outer end of piston rod 56 extends. A longitudinally extending slot 26 in bracket 24 is aligned with aperture 30 and defines slot like openings on opposite sides of bracket 24. A mounting block 50 is slideably confined within slot 26 and is adjustably threadably secured to the end of rod 56 by means of a threaded coupling 57. Adjustment of the threaded coupling 57 varies the longitudinal position of block 50 relative to rod 56. A shaft 52 extends transversely through block 50 and has mounted on opposite ends thereof rollers 54. Rollers 54 are therefore respectively positioned outboard of the slot 26, on opposite lateral sides of bracket 24.

Clamping plates 32 each comprise an enlarged base 38 and an elongate clamping arm 36, the outer extremities of clamping arms 36 being secured together as by welding through a connecting block 34. Apertures 42 and a bolt 44 pivotally mount plates 32 on opposite sides of bracket 24. Plates 32 further include cam slot openings 70 in the respective bases 38, within which there is received the corresponding rollers 54.

Cam slot openings 70 are of unique configuration and are respectively defined by first and second, opposing cam surfaces. One of the cam surfaces 72 is substantially continuously arcuate, the opposing cam surface being defined by a pair of arcuately shaped cam surface portions 74 and 76 connected by a shoulder-like cusp 78.

From the foregoing it may be appreciated that the clamping mechanism 13 is mounted for rotation on the support 12 by means of the flange 20 which captures the cylindrical end of bracket 24 within the counterbore of hole 18. End cap 62 of the piston and cylinder assembly 15 is drawn against one face of support 14 by pressure applied through adjustment of coupling 57. Thus, piston and cylinder assembly 15 rotate along with the clamping mechanism 13 when flange 20 is loosened such that the cylindrical end 33 of bracket 24 is allowed to rotate within the support 12.

Referring now also to FIGS. 5*a*-5*c*, in operation, with the piston 58 retracted as shown in FIGS. 1, 2 and 5*a*, rollers 54 are disposed within the upper portion of the cam slots 70 and clamping plates 32 are in an unclamped position. It will be understood that any suitable clamping pad, device etc. may be secured to the outer ends of clamping arms 36 to actually contact and thereby clamp the part. In order to shift the clamping plates 32 to a clamping position, fluid is introduced under pressure through inlet port 66 into the cylinder 60 thereby extending piston rod 56. Upon extension of rod 56, rollers 54 bear against cam surface portion 74 causing the clamping plates 32 to pivot about bolt 44. As the rod 56 continues to be displaced outwardly, rollers 54 ride over the cusp 78 down into the cam surface portion 76 at which time the rollers 54 commence exerting force against surface portion 76 and cusp 78. Continued outward displacement of rod 56 causes rollers 54 to return back over the cusp 78 and into surface portion 74 where the clamping arms 36 are fully displaced to their clamping position. At this point, in the event that fluid pressure is lost within the cylinder 60 the clamping plates 32 remain in their locked, clamped position by virtue of the fact that the cusps 78 engage rollers 54 and thus prevent return pivotal movement of clamping plates 32 until such time as rod 56 is retracted sufficiently to allow rollers 54 to clear cusps 78.

Clamping plates 32 are returned to their starting position by allowing fluid to exit through ports 66 and introducing fluid under pressure through ports 68 into the cylinder 60. This causes the rod 56 to retract. Upon retraction of rod 56, rollers 54 bear against cam surface 72 and roll clear of cusp 78, thus causing plates 32 to rotate counterclockwise as viewed in FIGS. 5*a*-5*d*.

The rotational position of the clamping arms 36 may be conveniently altered simply by loosening screws 22 and turning the entire clamping mechanism 13 until the desired rotational position is reached whereupon screws 22 are retightened thereby locking the clamping mechanism in place.

From the foregoing, it is apparent that the clamping assembly described above not only provides for the reliable accomplishment of the objects of the invention but does so in a particularly economical and efficient manner. It is recognized, of course, that those skilled in the art may make various modifications or additions to the preferred embodiment choosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. Rotatable clamping apparatus comprising:

a fluid operated motor mounted on said support and including a fluid driven, reciprocable piston;

a clamping mechanism rotatably mounted on said support and including a clamping member rotatable to any of a plurality of clamping positions upon rotation of said clamping mechanism, said clamping mechanism further including cam means for shifting said clamping member between a released position and a clamping position and an annular shoulder;

means for drivingly connected said cam means with said cylinder assembly; and locking means for selectively locking said clamping mechanism in any of said plurality of clamping positions and including a flange engaging said shoulder and a locking member for drawing said shoulder against said support.

2. The apparatus of claim 1, wherein said flange includes pair of semicircular interlocking portions and said locking means includes a plurality of bolts extending through said interlocking portions for drawing said flange against said shoulder and said support.

3. Rotatable clamping apparatus, comprising:

a support including an upstanding plate portion;

a fluid operated cylinder assembly mounted on the rear face of said plate portion and extending axially and rearwardly from said rear face;

a clamping mechanism rotatably mounted on the front face of said plate portion and including a clamping member rotatable about the longitudinal axis of said cylinder assembly to any of a plurality of angular clamping positions upon rotation of said clamping mechanism, said clamping mechanism further including cam means for shifting said clamping member between a released position and a clamping position;

means, including a piston rod forming a part of said cylinder assembly and extending through said plate portion, for drivingly connecting said cam means with said cylinder assembly; and means for selectively locking said clamping mechanism in any of said plurality of angular clamping positions.

4. The apparatus of claim 3, wherein said cylinder assembly is mounted for rotation with said clamping mechanism about said axis and said support further includes a base portion for securing said clamping apparatus to a support structure.

5. The apparatus of claim 3, wherein:

said clamping mechanism includes a bracket having an opening in one end thereof centered on said axis and an axially extending slot axially aligned with said opening, said slot extending transversely in said bracket to define axially extending openings in the sides of said bracket, said piston rod extends forwardly and coaxially through said opening;

said cam means includes a pair of transversely spaced cam members, said cam members being connected with each other by a shaft extending transversely through a mounting block secured to the forward end of said piston and slidably mounted in said slot.

6. The apparatus of claim 5, wherein said cam means further includes a pair of cam plates pivotally mounted on said bracket, each of said cam plates having a cam track defined therein, said cam members comprising rollers respectively confined within said cam tracks, said clamping member being mounted on said cam plates.

7. The apparatus of claim 6, wherein said clamping member includes a pair of spaced apart, parallel clamping arms respectively formed integral with said cam plates.

8. The apparatus of claim 6, wherein each of said cam tracks include:

first and second opposing cam surfaces adapted to be alternately engaged by a corresponding cam member, said first cam surface being substantially continuously arcuate, said second cam surface including first and second arcuate portions and a cusp between said first and second portions for locking said cam member against movement.

9. Clamping apparatus, comprising:

a support;

a piston and cylinder assembly including a reciprocable output rod, said piston and cylinder assembly being mounted on said support for rotation about the longitudinal axis of said rod;

a bracket mounted for rotation with said piston and cylinder assembly on said support, said bracket including an annular shoulder slideably engageable with said support, said bracket further including an opening in one end thereof and guide slot axially aligned with said opening, said rod extending through said opening into said guide slot;

means for selectively clamping said shoulder against said support whereby to lock said bracket in any of a plurality of rotational positions relative to said support;

a pair of transversely spaced plate members connected together and respectively pivotally mounted on opposite sides of said bracket, each of said plate members including a clamping arm and having a cam track defined therein; and, a pair of transversely spaced cam members secured to one end of said rod and respectively disposed within said cam tracks.

10. The apparatus of claim 9, wherein each of said cam tracks is defined by first and second opposing cam surfaces, said first surface being substantially continuously arcuate and adapted to be engaged by a corresponding cam member when said rod shifts in one longitudinal direction, said second surface including first and second arcuate portions having a cusp therebetween, said corresponding cam member engaging said second surface when said rod shifts in the other longitudinal direction, said cusp preventing pivoting of said plate when said rod has shifted to an extended position in the event fluid pressure in said piston and cylinder assembly is lost.

11. The apparatus of claim 9, wherein said bracket includes a cylindrically shaped end and said support includes a hole therethrough within which said cylindrical end is rotatably confined.

* * * * *